United States Patent
Rankins

[15] 3,672,459
[45] June 27, 1972

[54] SINGLE WHEEL, SELF-PROPELLING ATTACHMENT

[72] Inventor: Everett V. Rankins, 329 Flores Court, Manteca, Calif. 95336

[22] Filed: July 1, 1970

[21] Appl. No.: 51,597

[52] U.S. Cl. ............................................180/13, 230/DIG. 7
[51] Int. Cl. ..........................................................B62d 61/08
[58] Field of Search ............................180/13, 12, 26, 52; 280/DIG. 7

[56] References Cited

UNITED STATES PATENTS

| | | | |
|---|---|---|---|
| 3,370,666 | 2/1968 | Holtzclaw et al. | 180/26 |
| 3,519,097 | 7/1970 | Commons | 180/26 |
| 2,957,534 | 10/1960 | Burdett | 10/26 X |
| 2,647,355 | 8/1953 | Luke | 56/343 |

Primary Examiner—Kenneth H. Betts
Attorney—Julian Caplan

[57] ABSTRACT

For attachment to farm implements of the type of balers, rakes, spraying equipment and the like, a wide single wheel is mounted on an axle rotatable within an inverted U-frame. A tongue is connected to the center of the U-frame about a vertical pivot, the rear end of the tongue being bolted to the implement. A prime mover for the axle is mounted on the U-frame, as is a cab for the operator and controls.

4 Claims, 6 Drawing Figures

PATENTED JUN 27 1972 3,672,459

INVENTOR.
EVERETT V. RANKINS
BY
Julian Caplan
ATTORNEY

INVENTOR.
EVERETT V. RANKINS
BY
Julian Caplan
ATTORNEY

INVENTOR.
EVERETT V. RANKINS
BY Julian Caplan
ATTORNEY

SINGLE WHEEL, SELF-PROPELLING ATTACHMENT

This invention relates to a new and improved single wheel, self-propelling attachment for farm implements and the like. More particularly, the invention provides an attachment which replaces the conventional four-wheel tractor used to propel implements such as balers, rakers, spray rigs and a variety of farm implements.

A principal feature of the present invention is the fact that the self-propelling attachment is mounted on a single wheel as distinguished from the conventional three or four wheels used in a tractor. The attachment causes less trampling of the crop and further results in less wear of tires.

When the implement such as baler, rake or the like wears out, the self-propelled unit of the present invention may be removed and attached to a new unit, thereby salvaging the considerable cost of the self-propelled unit. Further, seasonally, the unit may be removed and installed on other implements. This is a feature of the invention of great economic advantage.

For example, it is common to bale hay in the summer and to spray field crops in the winter. The self-propelling unit may be attached to a baler in the summer and then detached and connected to a spray rig in the winter.

Another principal feature of the invention is the fact that the attachment is relatively short, as distinguished from conventional tractors. The shortening of the unit achieves a shorter turning radius.

Another feature of the invention is the fact that the engine shaft is transverse to the direction of movement of the unit and there is a direct hook-up from the engine to the driving axle.

Another feature of the invention is the fact that the driver, prime mover and the wheel turn as a unit. This eliminates complicated drive shafts used in other self-propelling units. The fact that the driver is mounted on the propelling unit and preferably on the top of same, provides for better visibility both ahead and also to observe the operation of the implement being drawn. The driver is above the ground a considerable distance and dust is not as great a problem as would otherwise be the case.

A principal feature of the invention is in the economy of the device. The necessity of having a separate tractor for the implement is eliminated and the need to truck the implement to a remote field when it is moved from field to field is eliminated. The device has a relatively high road speed as compared with conventional farm tractors and is considerably faster than self-propelled equipment.

Another feature of the invention is the fact that a wide, low-pressure tire is used to support the unit which provides a smooth ride without the necessity of using springs and also provides good traction because of the unusual width of the tire.

Other objects of the present invention will become apparent upon reading the following specification and referring to the accompanying drawings in which similar characters of reference represent corresponding parts in each of the several views.

Figures 1, 2:
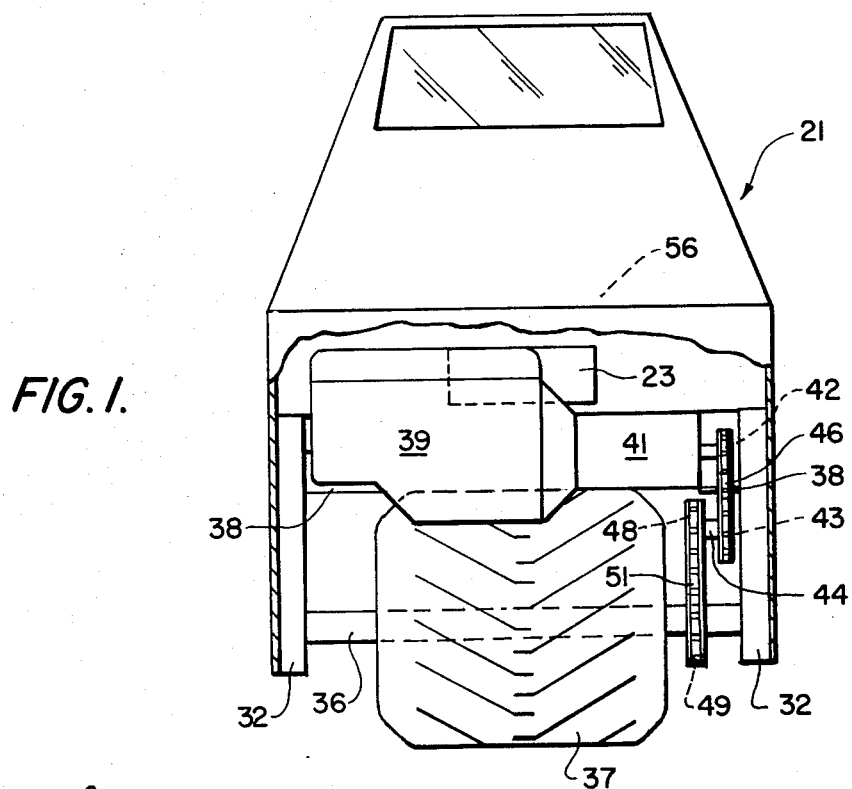
FIG. 1 is a front elevational view of the device partially broken away in section to reveal internal construction.
FIG. 2 is a side elevation, also partially broken away in section to reveal internal construction.
Figure 3:
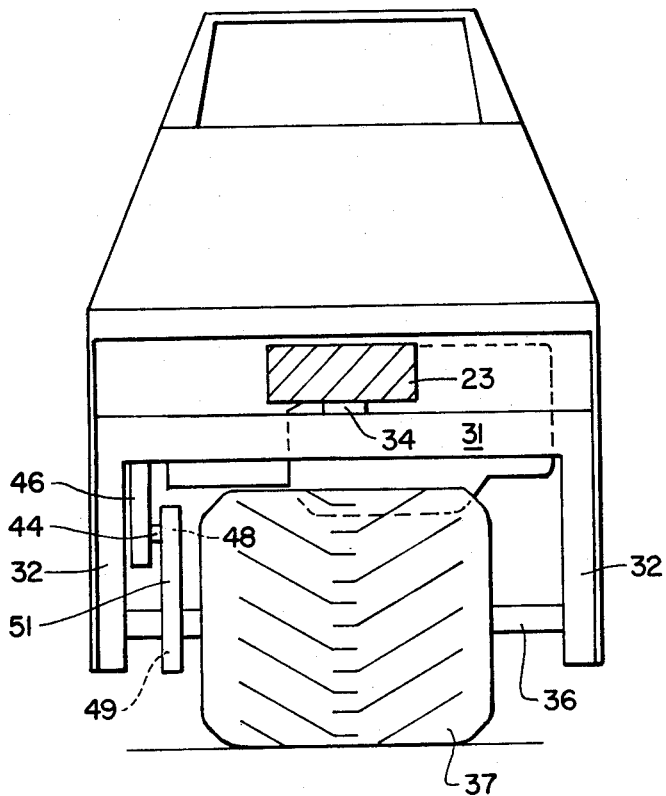
FIG. 3 is a rear elevation of the self-propelling unit.
Figure 4:
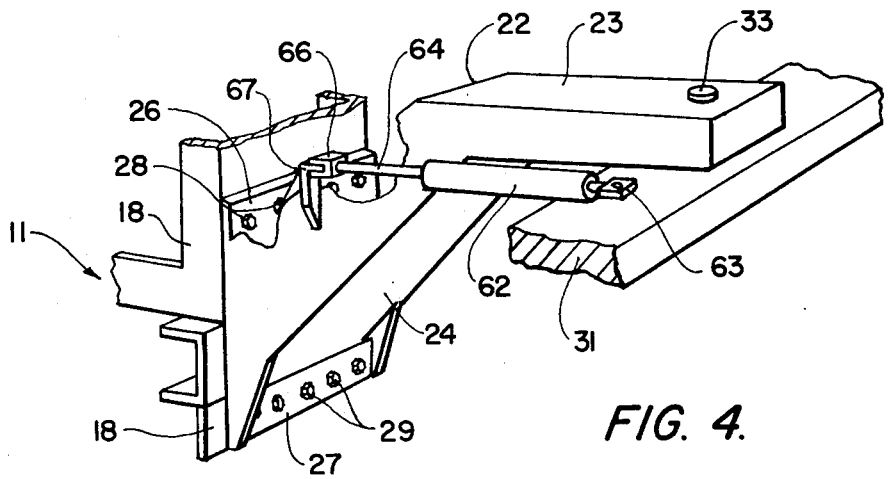
FIG. 4 is a fragmentary, perspective view showing the pivotal attachment of the towing tongue to the frame.
Figure 5:
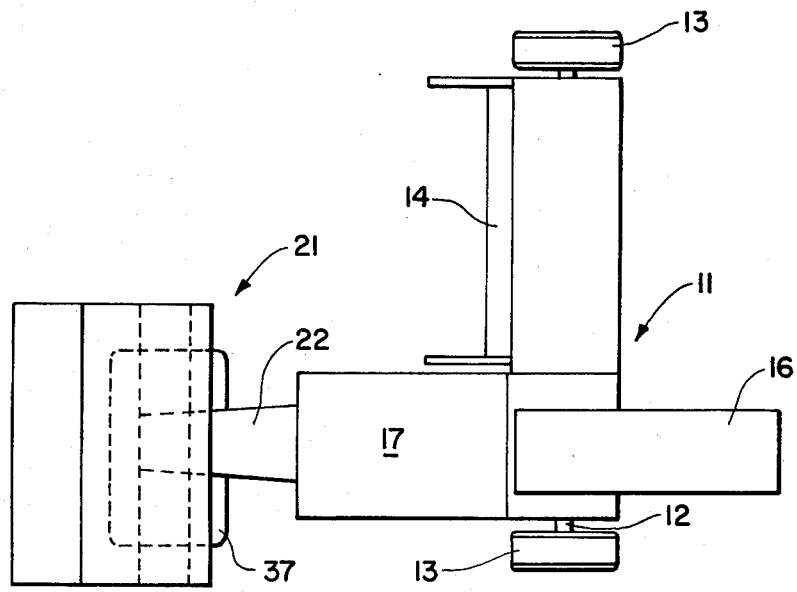
FIG. 5 is a top plan of the unit attached to an implement.
Figure 6:
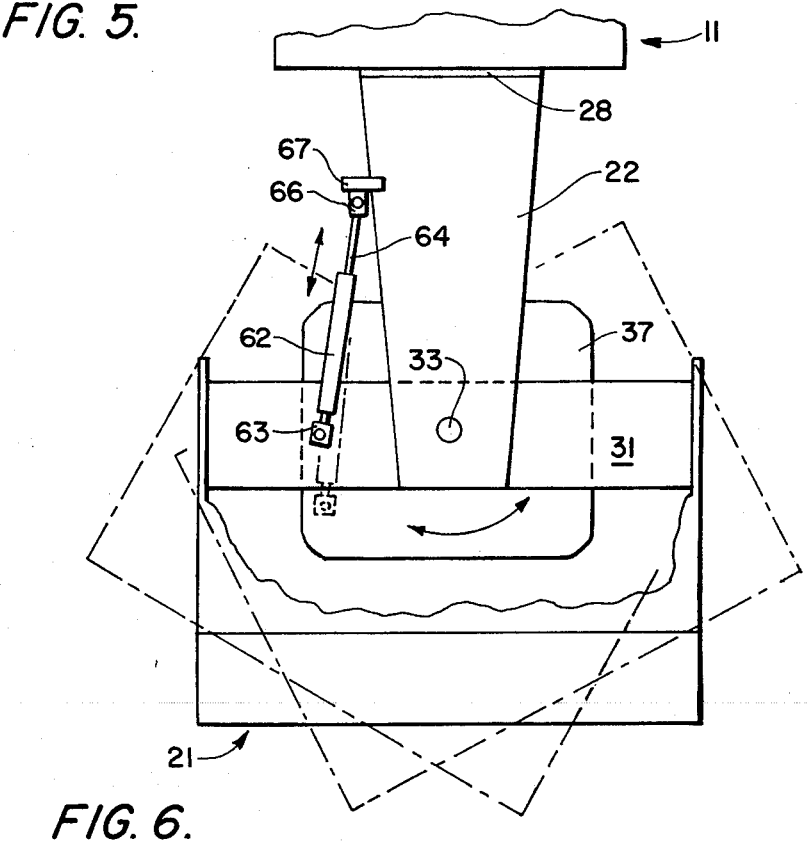
FIG. 6 is an enlarged schematic view showing the steering of the unit.

In the accompanying drawings the unit is shown attached to a baler 11. It will be understood that the implement shown is merely representative of the different types of farm implements on which the device may be installed. Baler 11 has a transverse axle 12 having ground support wheels 13 at either side. Extending transversely of the direction of movement of baler 11 is a pick-up mechanism 14, not illustrated in detail and well-known in this art. The mechanism 14 feeds into a baling column 16 which extends longitudinally rearwardly and has means for compacting charges of hay into a complete bale. The baler 11 is a very complicated mechanism and is not herein illustrated in detail. In general, it is driven by a prime mover 17 which drives the pick-up 14 and the baling mechanism but does not self-propel the unit. In customary practice, the unit 11 is towed by means of a tractor, but the present invention is a substitute for such tractor. The unit hereinafter described in detail has adjacent its forward end horizontal transverse frame members 18 to which the device is attached as hereinafter described.

The self-propelling unit 21 is attached to implement 11 by means of a tongue 22 which has a horizontal forwardly directed front stretch 23 which merges with a downwardly rearwardly gradually widening stretch 24. The back of stretch 24 is provided with transverse top and bottom flanges 26, 27 which are bolted to members 18 by means of top bolts 28 and bottom bolts 29. It will be understood that the precise attachment of tongue 22 to implement 11 is subject to certain modification depending upon the construction of unit 11. However, in general, the attachment is such that the tongue 22 becomes a rigid forward projection of the implement 11 and is semi-permanent in nature. When necessary, bolts 28, 29 may be removed so that the tongue 22 may be attached to other implements.

Unit 21 has a heavy rigid U-shaped frame having a top frame member 31 extending horizontally almost the entire width of the unit and from which depend vertical sides 32 or legs. A vertical pivot pin 33 extends through stretch 23 and is received in a bearing 34 on the top of member 31. Thus, the tongue 22 may turn relative to members 31, 32.

Extending transversely between the lower ends of legs 32 is a horizontal axle 36 on which is mounted a wheel having a low-pressure, extremely wide tire 37 provided with traction grips. Tire 37 is commercially available for farm implements and is sold under the name "Terra Tire." Mounted forwardly of top member 31 is a prime mover support 38 extending transversely of the unit and supporting thereon a prime mover 39 which may be a gasoline or Diesel driven engine. The engine 39 may be connected to a transmission 41, or, alternatively, an air-cooled engine may be used without a transmission. The power take-off of engine 39 is a sprocket pinion 42 which drives a sprocket 43 on transverse horizontal jack shaft 44 mounted on one of the legs 32. A first chain 46 interconnects pinion 42 and sprocket 43 with a conventional chain tightener 47 interposed. Second pinion 48 on shaft 44 drives a second sprocket 49 on axle 36 by means of a chain 51.

A platform 56 is mounted above frame member 31 and fixed thereto and the driver's seat 57 is supported above platform 56. Thus the operator is above the dust created by operation of the propelling unit and the implement being propelled and has good visibility forwardly and also can easily observe the operation of the implement. The operator turns wheels 58 of steering shaft 59 and said shaft carries hydraulic steering valve 61 of the type used in power steering apparatus for other vehicles.

Steering of the unit is accomplished by means of a cylinder 62 which is horizontally rearwardly disposed and is pivotally connected to member 31 by pivot mounting 63. The rod 64 of cylinder 62 is pivotally connected by means of mounting 66 to a brace 67 fixed to the tongue stretch 24. When the operator turns wheel 58, valve 61 controls the pumping of hydraulic fluid to opposite ends of cylinder 62 to project and retract rod 64 and thereby steer the implement 11 relative to unit 21. Because of the mounting of tongue end 23 centrally above member 31, unit 21 may be turned through an angle of about 60° to either side making a tight steering radius feasible.

When unit 21 is connected to implement 11 in a semipermanent fashion, the unit 31 is readily propelled over the ground with the advantages heretofore stated. When implement 11 is to be replaced or when a season has changed so that the unit 21 may be used with another implement, the bolts 28, 29 or other fastening means are removed and the entire unit 21 may be used to pull another implement 11.

Although the foregoing invention has been described in some detail, by way of illustration and example for purposes of clarity of understanding, it is understood that certain changes and modifications may be practiced within the spirit of the invention and scope of the appended claims.

What is claimed is:

1. A self-propelling unit comprising a frame having a horizontal top member and depending substantially vertical legs on opposite sides of said top member, a tongue, the forward end of said tongue overlying said top member, pivot means pivotally connecting the forward end of said tongue to the middle of said top member for relative pivotal movement about a vertical axis, attachment means on the rearward end of said tongue to attach said tongue to an implement to be propelled, a single axle horizontally rotatably mounted in the lower ends of said legs, a wide, low-pressure-tired wheel mounted on said axle, a prime-mover mounting carried by said frame, a prime mover on said mounting, means driven by said prime mover for rotating said axle, steering means for turning said frame relative to said tongue about said vertical axis, a platform connected to, and supported by, said frame and overlying said tongue, an operator seat on said platform substantially directly above said pivot means, and a steering control on said platform for controlling said steering means.

2. A unit according to claim 1 in which said drive means directly drives said axle and said axle and said prime mover turn together about said vertical axis.

3. A unit according to claim 1, in which said steering means comprises valve means under control of the operator of said unit, a horizontal steering cylinder pivotally connected to said frame eccentric to said axis and a rod projecting from said cylinder and pivotally connected to said tongue remote from said frame, said valve means controlling said cylinder to turn said frame.

4. A unit according to claim 1, and an implement, said implement comprising an implement frame, at least one ground support for said implement frame, a second prime mover carried by said implement, and an agricultural mechanism on said implement frame driven by said second prime mover, said attachment means connected to said implement frame.

* * * * *